United States Patent
Rowson et al.

(10) Patent No.: US 9,065,496 B2
(45) Date of Patent: Jun. 23, 2015

(54) METHOD AND SYSTEM FOR SWITCHED COMBINED DIVERSITY WITH A MODAL ANTENNA

(71) Applicants: Sebastian Rowson, San Diego, CA (US); Jeffrey Shamblin, San Marcos, CA (US); Laurent Desclos, San Diego, CA (US); Abhishek Singh, San Diego, CA (US)

(72) Inventors: Sebastian Rowson, San Diego, CA (US); Jeffrey Shamblin, San Marcos, CA (US); Laurent Desclos, San Diego, CA (US); Abhishek Singh, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 0 days.

(21) Appl. No.: 14/337,062

(22) Filed: Jul. 21, 2014

(65) Prior Publication Data

US 2014/0327578 A1    Nov. 6, 2014

Related U.S. Application Data (63) Continuation of application No. 13/558,301, filed on Jul. 25, 2012, and a continuation-in-part of application No. 14/109,789, filed on Dec. 17, 2013, which is a continuation of application No. 13/548,895, filed on Jul. 13, 2012, now Pat. No. 8,633,863, which is a continuation-in-part of application No. 13/029,564, filed on Feb. 17, 2011, now Pat. No. 8,362,962, which is a continuation of application No. 12/043,090, filed on Mar. 5, 2008, now Pat. No. 7,911,402.

(60) Provisional application No. 61/511,117, filed on Jul. 25, 2011.

(51) Int. Cl.
| | |
|---|---|
| H01Q 1/38 | (2006.01) |
| H04B 7/04 | (2006.01) |
| H04B 7/08 | (2006.01) |
| H04B 7/10 | (2006.01) |

(52) U.S. Cl.
CPC ............... *H04B 7/04* (2013.01); *H04B 7/0825* (2013.01); *H04B 7/0854* (2013.01); *H04B 7/0857* (2013.01); *H04B 7/0871* (2013.01); *H04B 7/10* (2013.01)

(58) Field of Classification Search
CPC .. H04B 7/0825; H04B 7/0854; H04B 7/0857; H04B 7/0871
USPC .......... 343/700 MS, 725, 729, 745, 815, 816, 343/817, 834, 876
See application file for complete search history.

(56) References Cited

U.S. PATENT DOCUMENTS

| | | | | |
|---|---|---|---|---|
| 5,485,167 | A * | 1/1996 | Wong et al. | 343/753 |
| 6,326,921 | B1 * | 12/2001 | Egorov et al. | 343/700 MS |
| 6,429,818 | B1 * | 8/2002 | Johnson et al. | 343/702 |
| 6,614,400 | B2 * | 9/2003 | Egorov | 343/702 |

(Continued)

*Primary Examiner* — Tho G Phan
(74) *Attorney, Agent, or Firm* — Coastal Patent Law Group, P.C.

(57) ABSTRACT

A system and method for diversity implementation are provided, where diversity gains are obtained by using a hybrid of the switching technique and the combining technique in conjunction with the use of a modal antenna. The antenna system includes multiple antennas including at least one modal antenna that has multiple modes, and a processor for selecting one or more modes from the multiple modes associated with each of the at least one modal antenna, combining modes to form one or more combinations of modes, the modes in each of the one or more combinations including one of the one or more selected modes associated with each of the at least one modal antenna, and selecting one of the one or more combinations that optimizes correlation and/or a quality metric for diversity.

23 Claims, 8 Drawing Sheets

(56) References Cited

U.S. PATENT DOCUMENTS

| | | |
|---|---|---|
| 7,265,720 B1 * | 9/2007 | Ponce De Leon et al. .... 343/700 MS |
| 7,265,724 B1 * | 9/2007 | Tan et al. ...................... 343/702 |
| 7,696,928 B2 * | 4/2010 | Rowell ................... 343/700 MS |
| 7,847,740 B2 * | 12/2010 | Dunn et al. .................... 343/702 |
| 7,999,746 B2 * | 8/2011 | Cho et al. ............... 343/700 MS |

* cited by examiner

METHOD AND SYSTEM FOR SWITCHED COMBINED DIVERSITY WITH A MODAL ANTENNA

CROSS-REFERENCE TO RELATED APPLICATIONS

This application is a continuation (CON) of U.S. Ser. No. 13/558,301, filed Jul. 25, 2012; which claims benefit of priority with U.S. Provisional Ser. No. 61/511,117, filed Jul. 25, 2011; each of which is titled "METHOD AND SYSTEM FOR SWITCHED COMBINED DIVERSITY WITH A MODAL ANTENNA"; and a CIP of U.S. Ser. No. 14/109,789, filed Dec. 17, 2013 titled "MODAL ADAPTIVE ANTENNA USING PILOT SIGNAL IN CDMA MOBILE COMMUNICATION SYSTEM AND RELATED SIGNAL RECEIVING METHOD"; which is a CON of U.S. Ser. No. 13/548,895, filed Jul. 13, 2012, now U.S. Pat. No. 8,633,863, titled "MODAL ADAPTIVE ANTENNA USING PILOT SIGNAL IN CDMA MOBILE COMMUNICATION SYSTEM AND RELATED SIGNAL RECEIVING METHOD"; which is a CIP of U.S. Ser. No. 13/029,564, filed Feb. 17, 2011, now issued as U.S. Pat. No. 8,362,962, titled "ANTENNA AND METHOD FOR STEERING ANTENNA BEAM DIRECTION"; which is a CON of U.S. Ser. No. 12/043,090, filed Mar. 5, 2008, now issued as U.S. Pat. No. 7,911,402, titled "ANTENNA AND METHOD FOR STEERING ANTENNA BEAM DIRECTION";

each of which is commonly owned and their contents are hereby incorporated by reference.

BACKGROUND OF THE INVENTION

1. Field of the Invention

The present invention relates to a method and system for antenna diversity applications.

2. Description of the Related Art

As new generations of handsets and other wireless communication devices become smaller and embedded with increased applications, new antenna designs are required to address inherent limitations of these devices and to enable new capabilities. With classical antenna structures, a certain physical volume is required to produce a resonant antenna structure at a particular frequency and with a particular bandwidth. In multi-band applications, more than one such resonant antenna structure may be required. However, effective implementation of such complex antenna systems may be difficult due to size constraints associated with mobile devices.

Antenna diversity systems are often used to improve the quality and reliability of a wireless communication link. In many instances, the line of sight between a transmitter and receiver becomes blocked or shadowed with obstacles such as walls and other objects. Each signal bounce may introduce phase shifts, time delays, attenuations, and distortions which ultimately interfere at the receiving antenna. Thus, destructive interference in the wireless link is often problematic and results in a reduction in device performance. Antenna diversity schemes can mitigate interference from multipath environments by providing multiple signal perspectives. Antenna diversity can be implemented generally in several forms, including: spatial diversity, pattern diversity and polarization diversity.

Spatial diversity for reception includes multiple antennas having similar characteristics, which are physically spaced apart from one another. In multipath propagation conditions, as encountered with a blocked or shadowed line of sight path, each of the multiple receive antennas experiences a different fading characteristic. Accordingly, where a first antenna experiences a significant reduction in signal reception, the second antenna is likely to receive an effective signal. Collectively, the spatial diversity scheme can provide a robust link. Spatial diversity for transmission is also effective, although link improvements may be needed for the receive side of the base station.

Pattern diversity generally includes two or more co-located antennas with distinct radiation patterns. This technique utilizes antennas that generate directive beams and are usually separated by a short distance. Collectively, these co-located antennas are capable of discriminating a large portion of angle space and may additionally provide relatively higher gain with respect to an omnidirectional antenna element.

Polarization diversity generally includes paired antennas with orthogonal polarizations. Reflected signals can undergo polarization changes depending on the medium through which they are traveling. By pairing two complimentary polarizations, this scheme can immunize a system from polarization mismatches that would otherwise cause signal fade.

Each of the above diversity schemes requires one or more processing techniques to effectuate antenna diversity, such as switching, selecting and combining. Switching is one of the simple and efficient processing techniques and generally includes receiving a signal from a first antenna until the signal level fades below a threshold level, at which point active components such as switches engages the second antenna for communication with the receiver. Selecting is a processing technique which provides a single antenna signal to the receiver; however, the selecting process requires monitoring of signal to noise ratio (SNR) or other metrics for determining the optimum signal for utilization by the receiver. Both selecting and switching techniques may utilize active components, such as switches, to select a single antenna signal. Thus, the selecting and switching techniques may be collectively called switching techniques wherein the selection of the signal for utilization is carried out by controlling the switches or other active components coupled to the antennas. Combining is a processing technique wherein the multiple signals are weighted and combined into an output signal for communication with the receiver. Although the above techniques have been described for reception, their analogs are possible for transmit functions. Receive (Rx) diversity refers to configurations where a diversity scheme is applied for signal reception; and transmit (Tx) diversity refers to configurations where a diversity scheme is applied for signal transmission.

Examples of combining techniques include a minimum mean squared error (MMSE) combining technique, a maximum ratio combining (MRC) technique and an equal gain combining (EGC) technique. An exemplary algorithm to carry out each of these combining techniques may be summarized as follows. In the MMSE technique, the signals in paths are weighted where the weights are chosen to provide a minimum mean square error between the combined voltage stream and the signal. In the MRC technique, the signals in paths are weighted where the weights are chosen to be proportional to the respective signal amplitudes to maximize the output SNR. The weighted signals are then multiplied by respective phase factors prior to summing so that the signals are added in phase to maximize the gain. The EGC technique is a simplified version of the MRC technique, wherein the signals are weighted with the same factor and then multiplied by the phase factors.

SUMMARY OF THE INVENTION

A system and method for diversity implementation are provided, where diversity gains are obtained by using a hybrid of the switching technique and the combining technique in conjunction with the use of a modal antenna. The antenna system includes multiple antennas including at least one modal antenna and a processor coupled to the multiple antennas. Each of the at least one modal antenna is configured to have multiple modes. The processor selects one or more modes from the multiple modes associated with each of the at least one modal antenna, combines modes to form one or more combinations of modes, where the modes in each of the one or more combinations are associated respectively with the multiple antennas and include one of the one or more selected modes associated with each of the at least one modal antenna, and selects one of the one or more combinations that optimizes correlation and/or a quality metric for diversity.

In the above antenna system, the processor stores a correlation coefficient computed for each pair of modes for each use condition. The modes in each pair are a mode associated with one antenna in the multiple antennas and a mode associated with another antenna in the multiple antennas. Based on information on the correlation coefficients, the processor selects the one or more modes from the multiple modes associated with each of the at least one modal antenna to meet predetermined correlation optimization criteria under the use condition during a time interval. The predetermined correlation optimization criteria may include efficiency considerations. The antenna efficiency may be measured or computed, and stored in the processor. The processor turns on each of the one or more combinations sequentially, to perform a combining algorithm for each of the one or more combinations to compute the quality metric to select the one of the one or more combinations that optimizes the correlation and/or the quality metric for diversity.

A method of implementing diversity in an antenna system includes providing multiple antennas including at least one modal antenna. Each of the at least one modal has multiple modes. The method also includes first selecting one or more modes from the multiple modes associated with each of the at least one modal antenna, combining modes to form one or more combinations of modes, where the modes in each of the one or more combinations are associated respectively with the multiple antennas and include one of the one or more selected modes associated with each of the at least one modal antenna; and second selecting one of the one or more combinations that optimizes correlation and/or a quality metric for diversity.

In the above method, the first selecting step includes computing a correlation coefficient for each pair of modes for each use condition, where the modes in each pair are a mode associated with one antenna in the multiple antennas and a mode associated with another antenna in the multiple antenna, storing the correlation coefficients in a processor, and obtaining the one or more selected modes associated with each of the at least one modal antenna to meet predetermined correlation optimization criteria under the use condition during a time interval based on information on the correlation coefficients. The predetermined correlation optimization criteria may include efficiency considerations. The antenna efficiency may be measured or computed, and stored in the processor. The combining step includes turning on each of the one or more combinations sequentially. The second selecting step includes performing a combining algorithm for each of the one or more combinations to compute the quality metric to select the one of the one or more combinations that optimizes the correlation and/or the quality metric for diversity.

In the above system and method, the correlation coefficient may be an envelope correlation coefficient. The combining algorithm may be the MMSE combining technique, the MRC technique or the EGC technique. The quality metric may be signal to noise ratio (SNR), signal to interference-plus-noise ratio (SINR), receive signal strength indicator (RSSI), throughput or other channel quality indicators (CQI).

The above system and method can be configured for Rx diversity, Tx diversity or a combination of both.

The above method may further include steps of observing power consumption, and turning off one or more antennas and associated chains based on information on the power consumption for power conservation.

The above method may further include steps of observing a usage pattern during a predetermined period, and storing data of the usage pattern in a processor. The selection of one combination may be performed based on the data of the usage pattern until the usage pattern changes.

DETAILED DESCRIPTION

In Rx diversity for a conventional wireless mobile device, a main antenna is typically used to cover the transmit and receive bands. One or more diversity antennas are added in the device to cover the receive band and to counteract the effect of propagation and multipath fading, thus requiring additional receive chains. The diversity functions are effectuated typically by means of the switching technique described earlier to switch the receive path from one antenna to the other to improve the signal strength during a given time interval according to a decision based on metrics such as SNR. Another scheme involves the MRC technique described earlier to obtain maximum ratio signals and combine them with some phase factors. In a conventional spatial diversity architecture with multiple antennas, size constraints may become significant and coupling among the antennas as well as between the antennas and nearby electronics of a communication device may deteriorate transmission and reception qualities. Additionally, efficiency may deteriorate in many instances where multiple paths are energized and power consumption increases. Implementing two, three or more diversity antennas may provide system flexibility, but the volume and area requirements become increasingly severe as additional antennas and associated components and transmission lines are needed.

This document describes diversity implementation of an antenna system that can provide large diversity gains based on a hybrid of the switching technique and the combining technique in conjunction with the use of a modal antenna. A modal antenna, also referred to as a null-steering antenna, can generate multiple modes corresponding to multiple radiation patterns, equivalent to having a set of antennas with the same feed. Accordingly, implementation of a modal antenna allows for pattern and polarization diversity instead of spatial diversity, thereby requiring less volume and area. Further, the use of a modal antenna in Rx diversity requires less number of receiver chains than using one or more diversity antennas. Examples of structures and implementations of the modal antennas are provided in U.S. Pat. No. 7,911,402, entitled "ANTENNA AND METHOD FOR STEERING ANTENNA BEAM DIRECTION," issued on Mar. 22, 2011. The contents of the above patent are incorporated herein by reference and are summarized as follows.

Figure 1:
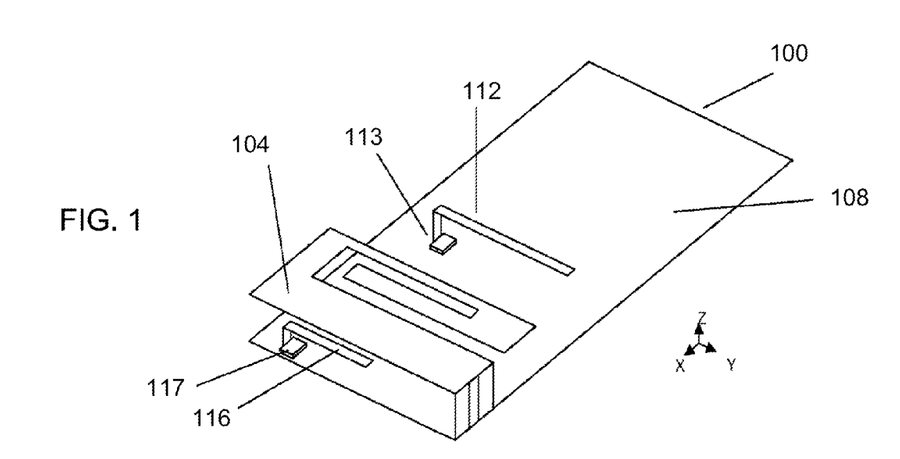
FIG. 1 illustrates an exemplary modal antenna.
Figure 2A:
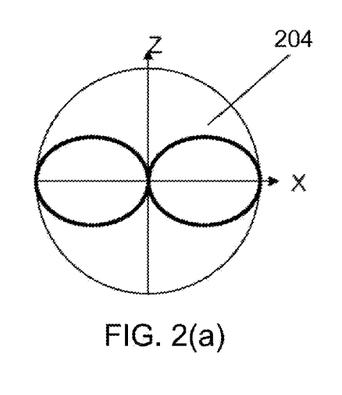
FIG. 2(a) illustrates a radiation pattern associated with the modal antenna of FIG. 1 in the first state.
Figure 2B:
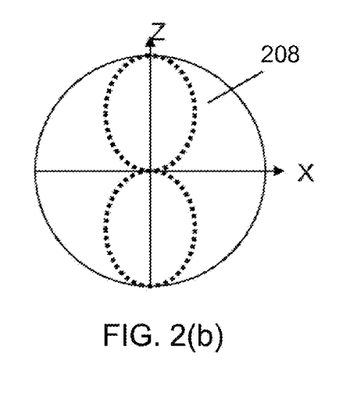
FIG. 2(b) illustrates a radiation pattern associated with the modal antenna of FIG. 1 in the second state.

FIG. 1 illustrates an exemplary modal antenna 100, which includes an Isolated Magnetic Dipole™ (IMD) element 104 placed on a ground plane 108, a first parasitic element 112 coupled to an first active element 113, and a second parasitic element 116 coupled to a second active element 117. The active elements 113 and 117 may include switches that either electrically connect (short) or disconnect (open) the parasitic elements 112 and 116 to the ground plane 108. This structure allows for two different modes of operation with a common frequency corresponding to a first state where the parasitic elements 112 and 116 are shorted to the ground and a second state where the parasitic elements 112 and 116 are open. FIG. 2(a) illustrates a radiation pattern 204 associated with the antenna 100 in the first state; and FIG. 2(b) illustrates a radiation pattern 208 in the second state, which shows a ninety-degree shift in direction as compared to the radiation pattern 204. Thus, by controlling the active elements 113 and 117 of the modal antenna 100, the operation of two modes can be obtained at the same frequency. The control scheme can be extended for multi-mode operations by incorporating, for example, tunable elements in the active elements for variable control and additional active elements for matching. Examples of these active elements include switches, tunable capacitors, tunable phase shifters, diodes, micro-electro-mechanical system (MEMS) switches, MEMS tunable capacitors, and transistors including a metal oxide semiconductor field effect transistor (MOSFET), a metal semiconductor field effect transistor (MESFET), a pseudomorphic high electron mobility transistor (pHEMT), a heterojunction bipolar transistor (HBT) or of other suitable technologies.

Figure 3:
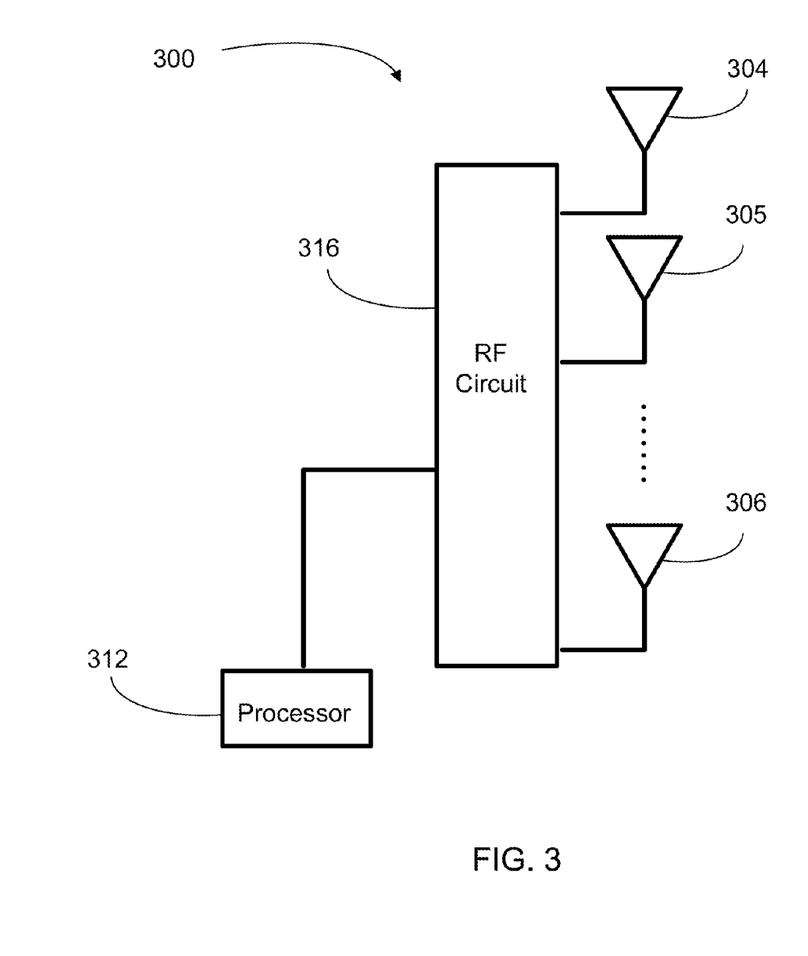
FIG. 3 illustrates an example of an antenna system including multiple antennas, wherein at least one of the multiple antennas is a modal antenna and the others are conventional non-modal antennas; or all the multiple antennas are modal antennas.

FIG. 3 illustrates an example of an antenna system 300 including multiple antennas 304, 305 . . . and 306, a processor 312 and a radio frequency (RF) circuit 316, wherein at least one of the multiple antennas 304, 305 . . . and 306 is a modal antenna and the others are conventional non-modal antennas; or all the multiple antennas 304, 305 . . . and 306 are modal antennas. This configuration may be used for spatial diversity. Rx diversity can be implemented by configuring two or more of the multiple antennas 304, 305 . . . and 306 for reception; Tx diversity can be implemented by configuring two or more of the multiple antennas 304, 305 . . . and 306 for transmission. Tx and Rx diversities can be collocated in the system, by configuring two or more antennas for transmission and other two or more antennas for reception. The multiple antennas 304, 305 . . . and 306 are coupled to the processor 312 through the RF circuit 316. The RF circuit includes various modules and components for processing signals, such as a transceiver, filters, duplexers, switches, power amplifiers, matching networks and so on. The processor 312 may be located in a baseband, for example, and configured to store data, specifications and other prerequisites as well as to perform algorithms to control the antennas and other components and modules for signal processing.

Diversity gain quantifies the improvement in signal level that is obtained using signals associated with different branches. Diversity gain permits a direct comparison of improvement by using multiple antennas compared to a single one. Diversity gain is maximized if the correlation of the signals associated with different branches is zero. Thus, the set of correlations, each between the signals received by the target antennas, is an important figure of merit for diversity. In particular, the envelope correlation coefficients (ECC) may be used to evaluate some of the diversity capabilities of a multi-antenna system. The ECC can be computed from theoretical or measured full-sphere complex (amplitude and phase) radiation patterns or scattering parameters of the structure. The correlation coefficients can be obtained for different use conditions, such as orientations of the handset, positions of a hand and/or a head in the proximity and other use scenarios.

Figure 4A:
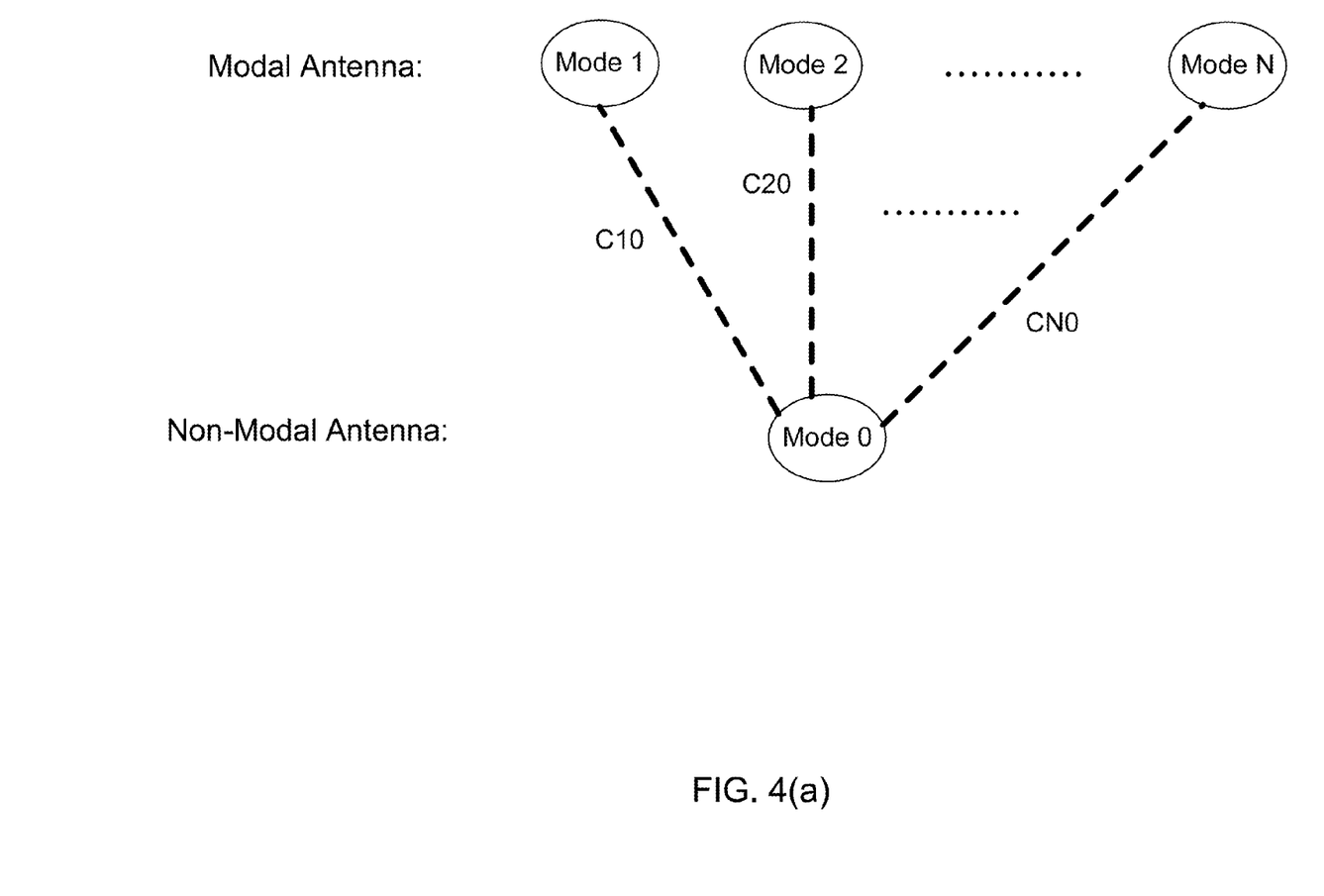
FIG. 4(a) illustrates a method of diversity implementation using the switching and combining techniques, in an example where the antenna system includes two antennas, a first antenna being a modal antenna and a second antenna being a conventional non-modal antenna.

FIG. 4(a) illustrates a method of diversity implementation using the switching and combining techniques, in an example where the antenna system 300 of FIG. 3 includes only two antennas, a first antenna being a modal antenna and a second antenna being a conventional non-modal antenna. The modal antenna can be configured to have multiple modes, denoted by mode 1, mode 2 . . . and mode N in the figure, corresponding to N different radiation patterns. As mentioned earlier, the modal antenna includes active elements such as switches that may incorporate tunable elements and are coupled to the parasitic elements of the modal antenna, allowing to select a mode of operation at a given time. On the other hand, the non-modal antenna typically has one mode, mode 0. First, the correlation coefficient, such as the ECC, is computed for each possible pair of a mode of the modal antenna and the mode 0 of the non-modal antenna, as denoted by C10 between the mode 1 and the mode 0, C20 between the mode 2 and the mode 0 . . . and CN0 between the mode N and the mode 0. These correlation coefficients may be obtained through simulations and/or measurements for different use conditions and pre-stored in the processor 312 of the antenna system 300 of FIG. 3. Second, based on the information on the pre-stored correlation coefficients, the processor selects one or more pairs that are likely to optimize the correlation under the specific use condition during a given time interval. The selection can be made based on predetermined correlation optimization criteria, which may include efficiency considerations. For example, the selected one or more pairs may be associated with the lowest correlation coefficients, or a compromise can be made to select one or more pairs with the second lowest correlation coefficients but with better overall efficiency. The antenna efficiency for each mode of each antenna can be measured or computed under each use condition, and may be pre-stored in the processor. Third, the processor controls the active elements of the modal antenna to switch on each of the selected one or more pairs sequentially, while the combining algorithm, for example, the MRC, is performed for each pair. The combining algorithm proceeds to compute a signal quality metric for each pair. Examples of such quality metrics include SNR, signal to interference-plus-noise ratio (SINR), receive signal strength indicator (RSSI), throughput and other channel quality indicators (CQI). Finally, the algorithm selects the pair that provides the optimum correlation and/or quality metric for diversity.

Figure 4B:
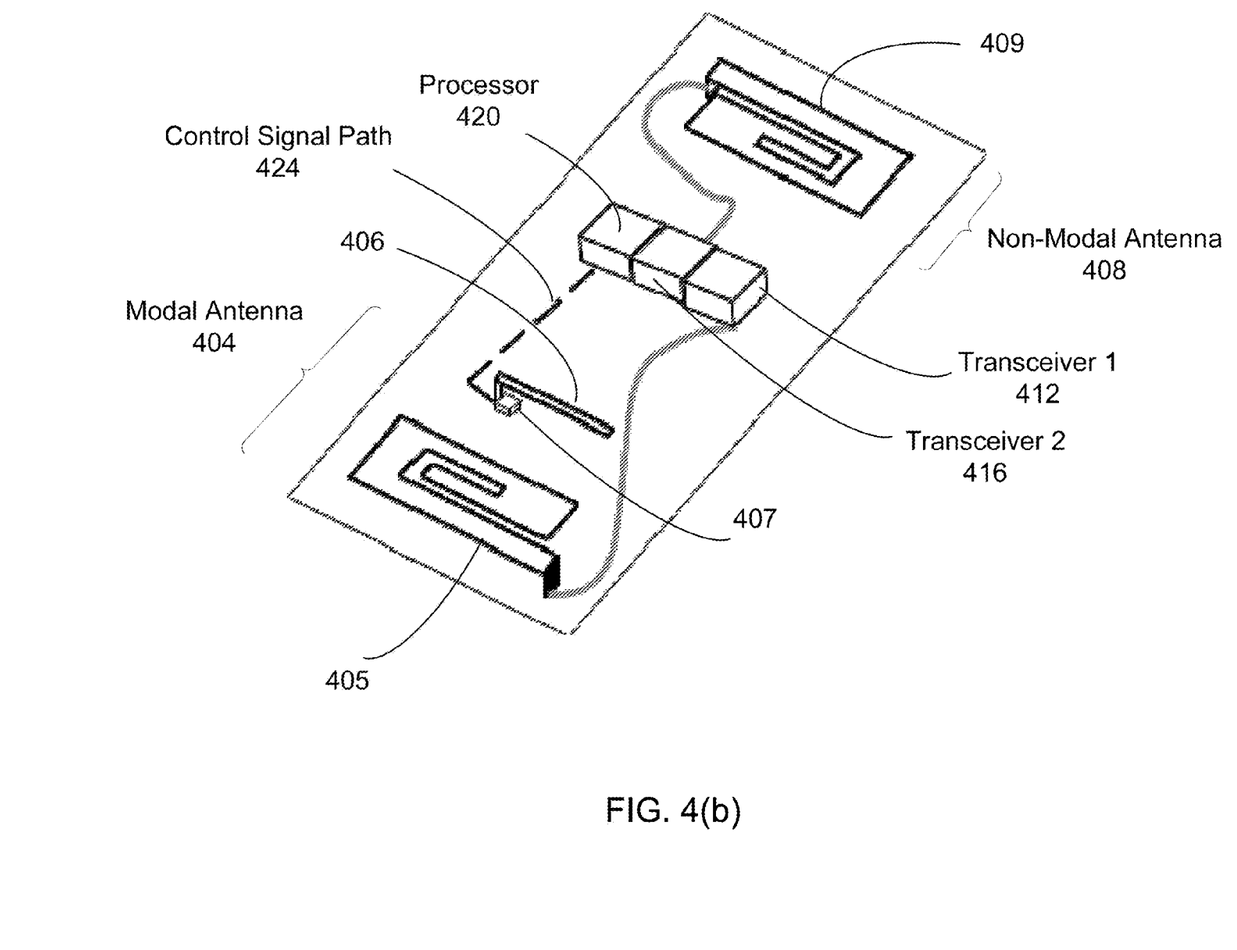
FIG. 4(b) illustrates an exemplary hardware configuration of an antenna system having one modal antenna and one conventional non-modal antenna, adapted to operate as illustrated in FIG. 4(a).

FIG. 4(b) illustrates an exemplary hardware configuration of an antenna system having one modal antenna 404 and one conventional non-modal antenna 408, adapted to operate as illustrated in FIG. 4(a). The modal antenna 404 is located at one edge of the board, having an IMD 405, a parasitic element 406 and an active element 407 coupled to the parasitic element 406. The non-modal antenna 408 is located at the other edge of the board, having a main radiator 409. The modal antenna 404 is coupled to a transceiver 1 412, and the non-modal antenna 408 is coupled to a transceiver 2 416, for processing Tx or Rx signals. A processor 420 is coupled to the transceiver 1 412 and the transceiver 2 416 for controlling signals and performing algorithms for diversity. Furthermore, in this example, the processor 420 is directly coupled to the active element 407 to configure the parasitic element 407 to generate multiple modes associated with the modal antenna 404 by the switching control, and the control signal path 424 is indicated by the dashed line in this figure.

Figure 5A:
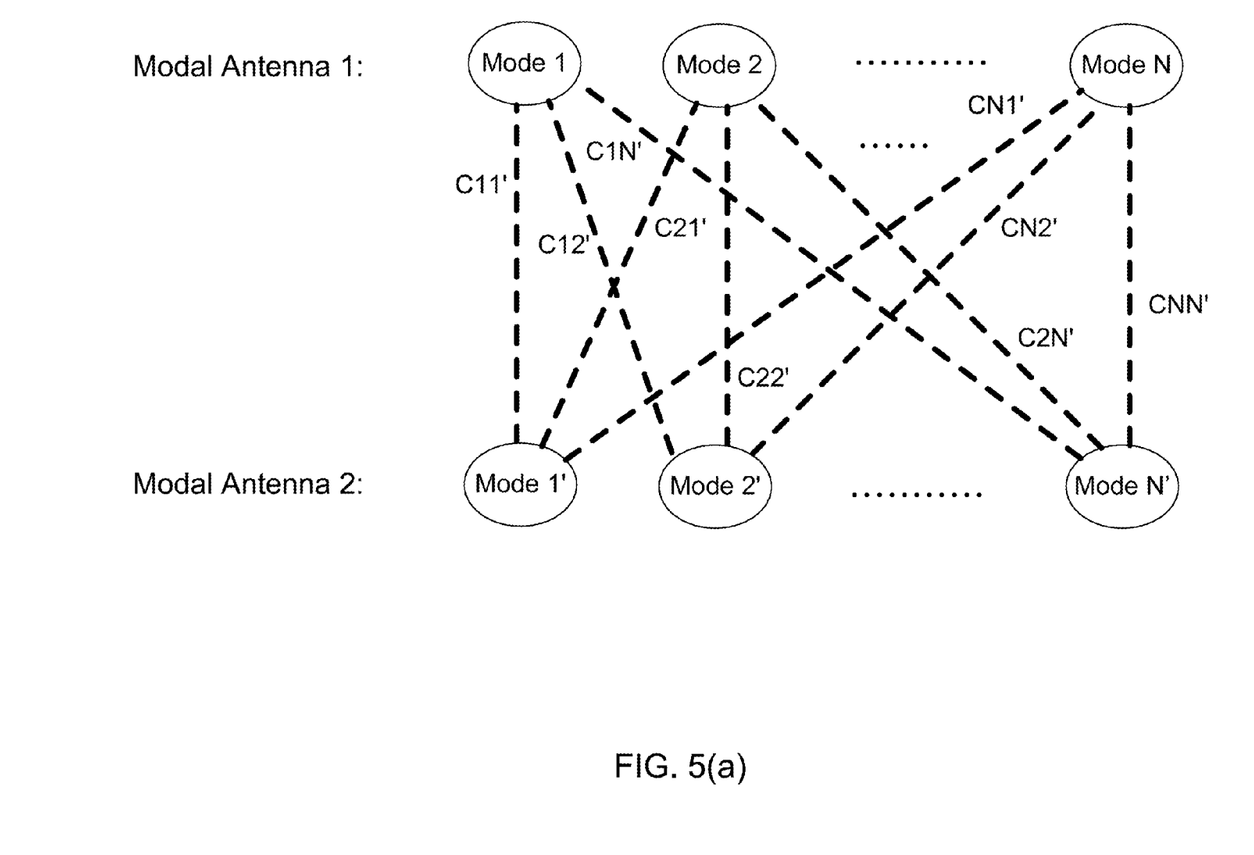
FIG. 5(a) illustrates a method of diversity implementation using the switching and combining techniques, in an example where the antenna system includes two antennas, both being modal antennas.

FIG. 5(a) illustrates a method of diversity implementation using the switching and combining techniques, in an example where the antenna system 300 of FIG. 3 includes only two antennas, both being modal antennas, as denoted by modal antenna 1 and modal antenna 2 in the figure. The modal antenna 1 can be configured to have a set of multiple modes, denoted by mode 1, mode 2 . . . and mode N in the figure, corresponding to N different radiation patterns; and the modal antenna 2 can be configured to have another set of multiple modes, denoted by mode 1', mode 2' . . . and mode N' in the figure, corresponding to N' different radiation pattern. As mentioned earlier, each of the modal antennas 1 and 2 includes active elements such as switches that may incorporate tunable elements and are coupled to the parasitic elements, allowing to select a mode of operation at a given time. First, the correlation coefficient, such as the ECC, is computed for each possible pair of a mode of the modal antenna 1 and a mode of the modal antenna 2, as denoted by C11' for the mode 1 and the mode 1', C12' for the mode 1 and the mode 2' . . . and CNN' for the mode N and the mode N'. These correlation coefficients may be obtained through simulations and/or measurements for different use conditions and pre-stored in the processor 312 of the antennas system 300 of FIG. 3. Second, based on the information on the pre-stored correlation coefficients, the processor selects one or more pairs that are likely to optimize the correlation under the specific use condition during a given time interval. The selection can be made based on predetermined correlation optimization criteria, which may include efficiency considerations. For example, the selected one or more pairs may be associated with the lowest correlation coefficients, or a compromise can be made to select one or more pairs with the second lowest correlation coefficients but with better overall efficiency. The antenna efficiency for each mode of each antenna can be measured or computed under each use condition, and may be pre-stored in the processor. Third, the processor controls the active elements of the modal antennas 1 and 2 to switch on each of the selected one or more pairs sequentially, while the combining algorithm, such as the MRC, is performed for each pair. The combining algorithm proceeds to compute a signal quality metric for each pair. Finally, the algorithm selects the pair that provides the optimum correlation and/or quality metric.

Figure 5B:
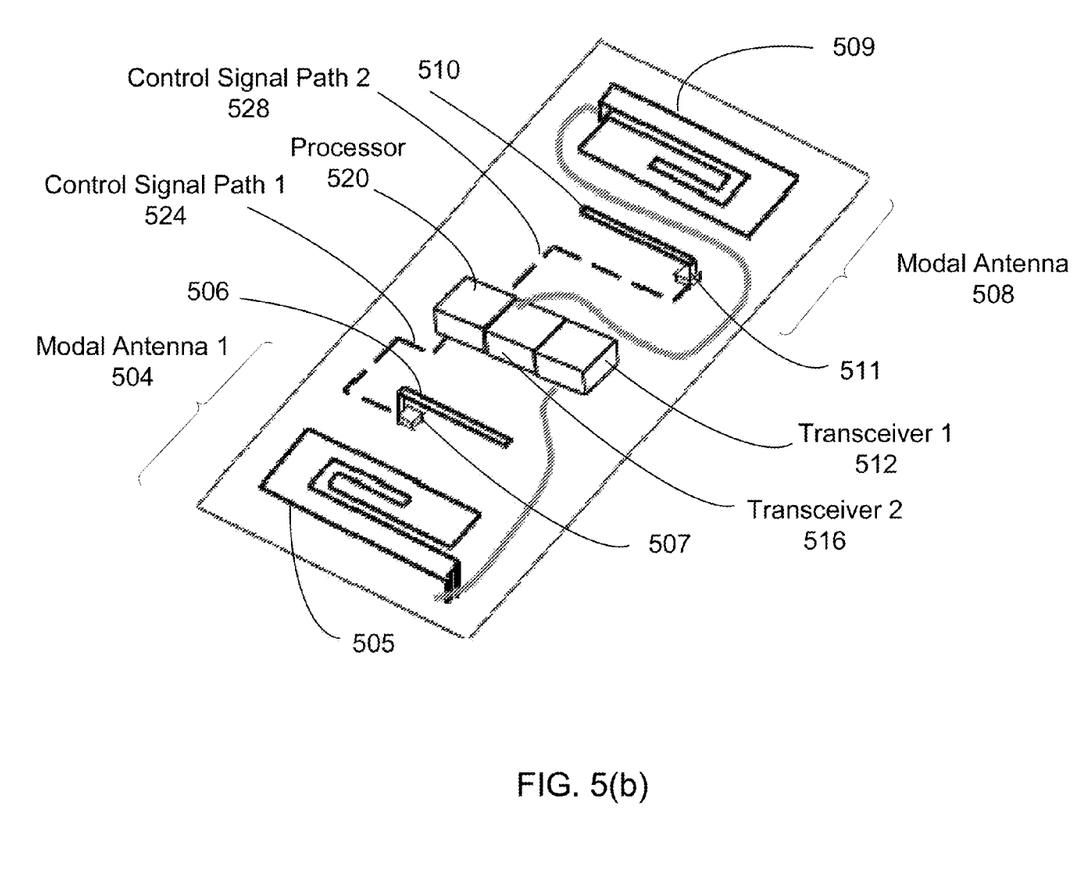
FIG. 5(b) illustrates an exemplary hardware configuration of an antenna system having two modal antennas, a modal antenna 1 and a modal antenna 2, adapted to operate as illustrated in FIG. 5(a).

FIG. 5(b) illustrates an exemplary hardware configuration of an antenna system having two modal antennas, a modal antenna 1 504 and a modal antenna 2 508, adapted to operate as illustrated in FIG. 5(a). The modal antenna 1 504 is located at one edge of the board, having an first IMD 505, a first parasitic element 506 and a first active element 507 coupled to the first parasitic element 506. The modal antenna 2 508 is located at the other edge of the board, having an second IMD 509, a second parasitic element 510 and a second active element 511 coupled to the second parasitic element 510. The modal antenna 1 504 is coupled to a transceiver 1 512, and the modal antenna 2 508 is coupled to a transceiver 2 516, for processing Tx or Rx signals. A processor 520 is coupled to the transceiver 1 512 and the transceiver 2 516 for controlling signals and performing algorithms for diversity. Furthermore, in this example, the processor 520 is directly coupled to the first active element 507 and the second active element 511 to configure the first parasitic element 506 and the second parasitic element 510, respectively, to generate multiple modes associated with the respective antennas by the switching control. The control signal path 1 524 to the first active element 507 as well as the control signal path 2 528 to the second active element 511 are indicated by the dashed lines in this figure.

Figure 6:
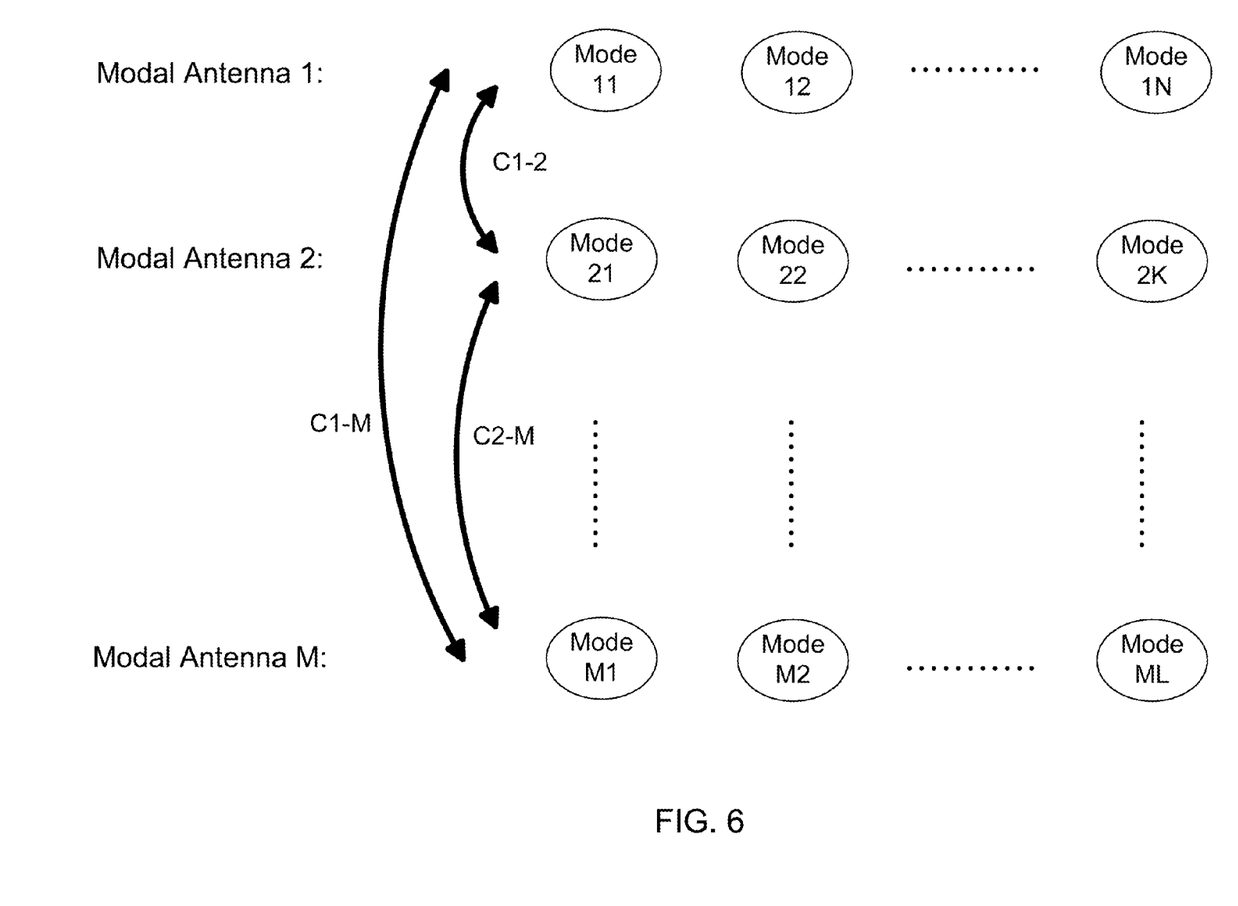
FIG. 6 illustrates a method of diversity implementation using the switching and combining techniques, in an example where the antenna system includes multiple modal antennas.

FIG. 6 illustrates a method of diversity implementation using the switching and combining techniques, in an example where the antenna system 300 of FIG. 3 includes multiple modal antennas 1, 2 . . . and M. The modal antenna 1 can be configured to have N-number of multiple modes, denoted by mode 11, mode 12 . . . and mode 1N; the modal antenna 2 can be configured to have K-number of multiple modes, denoted by mode 21, mode 22 . . . and mode 2K; . . . ; and the modal antenna M can be configured to have L-number of multiple modes, denoted by mode M1, mode M2, . . . and mode ML. The correlation coefficient, such as the ECC, is computed for each possible pair of a mode of one modal antenna and a mode of another modal antenna. For example, a set of correlation coefficients C1-2 for the modal antenna 1 and the modal antenna 2 includes the correlation coefficient for each possible pair of a mode of the modal antenna 1 and a mode of the modal antenna 2. Similarly, a set of correlation coefficients C1-M for the modal antenna 1 and the modal antenna M includes the correlation coefficient for each possible pair of a mode of the modal antenna 1 and a mode of the modal antenna M; and a set of correlation coefficients C2-M for the modal antenna 2 and the modal antenna M includes the correlation coefficient for each possible pair of a mode of the modal antenna 2 and a mode of the modal antenna M. These correlation coefficients may be obtained through simulations and/or measurements for different use conditions and pre-stored in the processor 312 of the antennas system 300 of FIG. 3. Based on information on the pre-stored correlation coefficients, the processor selects one or more modes from the multiple modes of each modal antenna, which are likely to optimize the overall correlation under the specific use condition during a given time interval. The selection can be made based on predetermined correlation optimization criteria, which may include efficiency considerations. For example, the selected one or more modes may be associated with the lowest correlation coefficients, or a compromise can be made to select one or more modes with the second lowest correlation coefficients but with better overall efficiency. The antenna efficiency for each mode of each antenna can be measured or computed under each use condition, and may be pre-stored in the processor. The processor then combines modes to form one or more combinations of modes, wherein the modes in each combination are associated respectively with the multiple antennas in the system and include one of the one or more selected modes of each modal antenna. The processor then controls the active elements of the modal antennas 1, 2 . . . and M to switch on each of the one or more combinations sequentially, while the combining algorithm, such as the MRC, is performed for each combination. The combining algorithm proceeds to compute a signal quality metric for each combination. Finally, the algorithm selects the combination that provides the optimum correlation and/or quality metric.

The diversity implementation for the antenna system 300 of FIG. 3 including both modal antennas and conventional non-modal antennas can be similarly carried out as in the example of FIG. 6, where all the antennas are modal. The correlation coefficient, such as the ECC, is computed for each possible pair of a mode of one antenna and a mode of another antenna. When both antennas are modal, all possible pairs of modes are obtained as illustrated in FIG. 5. When one antenna is modal and the other is non-modal, all possible pairs of modes are obtained as illustrated in FIG. 4. When both antennas are non-modal, only one pair is formed between the single mode of one non-modal antenna and the single mode of the other non-modal antenna. Based on information on the pre-stored correlation coefficients, the processor selects one or more modes from the multiple modes of each modal antenna, which are likely to optimize the overall correlation under the specific use condition during a given time interval. The selection can be made based on predetermined correlation optimization criteria, which may include efficiency considerations. For example, the selected one or more modes may be associated with the lowest correlation coefficients, or a compromise can be made to select one or more modes with the second lowest correlation coefficients but with better overall efficiency. The antenna efficiency for each mode of each antenna can be measured or computed under each use condition, and may be pre-stored in the processor. The processor then combines modes to form one or more combinations of modes, wherein the modes in each combination are associated respectively with the multiple antennas in the system and include one of the one or more selected modes of each modal antenna. The processor then controls the active elements of the modal antennas to switch on each of the one or more combinations sequentially, while the combining algorithm, such as the MRC, is performed for each combination. The combining algorithm proceeds to compute a signal quality metric for each combination. Finally, the algorithm selects the combination that provides the optimum correlation and/or quality metric.

Figure 7:
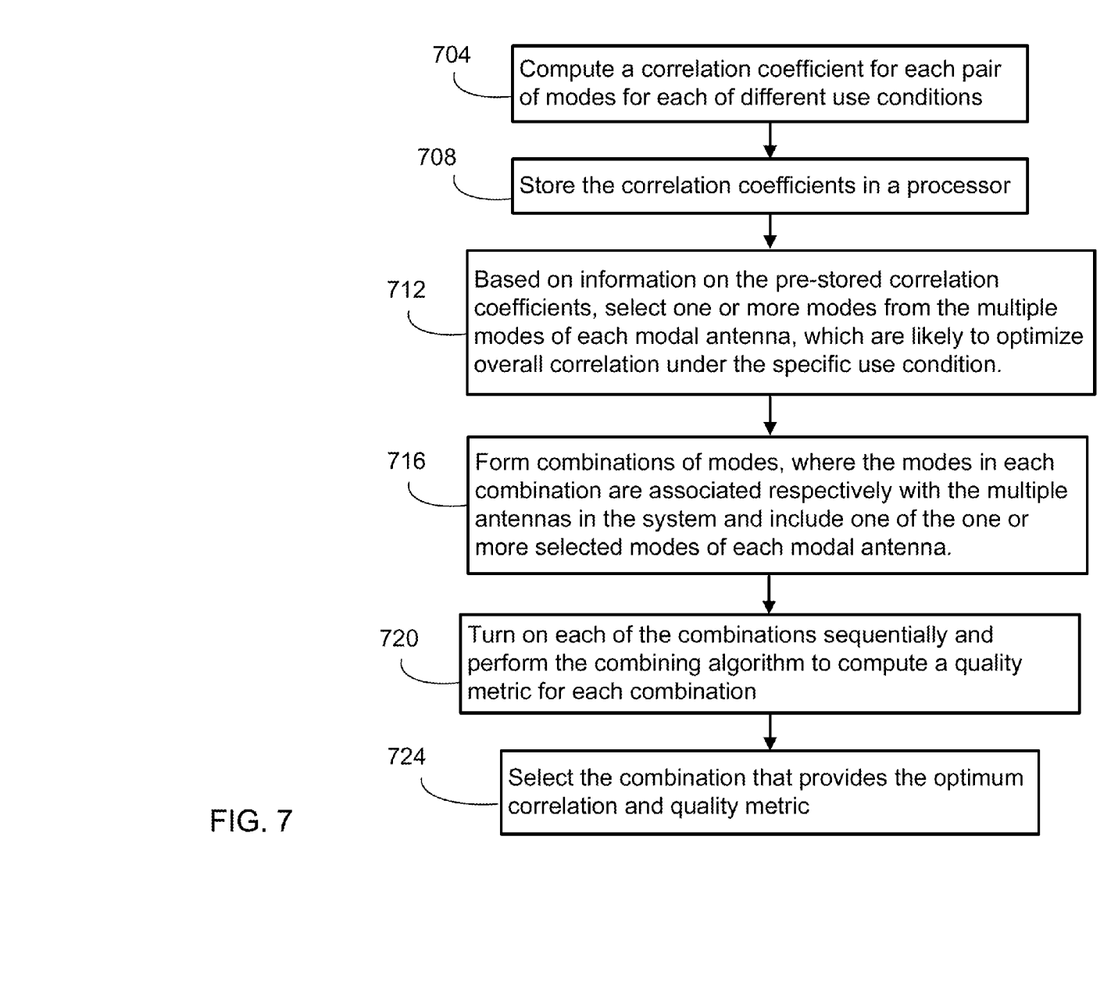
FIG. 7 is a flow chart illustrating an exemplary method of diversity implementation according to the present scheme using an antenna system including at least one modal antenna.

As described in the above examples, the present diversity implementation utilizes the switching technique to select one or more modes from the multiple modes of each modal antenna, while utilizing the combining technique to combine the selected modes from respective antennas. Thus, the present scheme presents a hybrid of the switching technique and the combining technique providing pattern and polarization diversity and spatial diversity, respectively. FIG. 7 is a flow chart illustrating an exemplary method of diversity implementation according to the present scheme using an antenna system including at least one modal antenna. In the step 704, a correlation coefficient for each pair of modes is computed for each of different use conditions, such as orientations of the handset, positions of a hand and/or a head in the proximity and other use scenarios. The pair of modes is a combination of a mode of one antenna and a mode of another antenna. Thus, when the antenna is a modal antenna that has multiple modes, each mode is sequentially selected to constitute a pair, and when the antenna is a conventional non-modal antenna, there is typically one mode associated with the antenna that is used to constitute a pair. Examples of correlation coefficients include the ECC, which can be obtained from theoretical or measured full-sphere complex (amplitude and phase) radiation patterns or scattering parameters of the structure. In the step 708, these correlation coefficients are stored in a processor together with the use conditions information in a look-up table format, for example. In the step 712, based on information on the pre-stored correlation coefficients, one or more modes are selected from the multiple modes of each modal antenna, which are likely to optimize the overall correlation under the specific use condition during a given time interval. The selection can be made based on predetermined correlation optimization criteria, which may include efficiency considerations. For example, the selected one or more modes may be associated with the lowest correlation coefficients, or a compromise can be made to select one or more modes with the second lowest correlation coefficients but with better overall efficiency. The antenna efficiency for each mode of each antenna can be measured or computed under each use condition, and may be pre-stored in the processor. In the step 716, one or more combinations of modes are formed, wherein the modes in each combination are associated respectively with the multiple antennas in the system and include one of the one or more selected modes of each modal antenna. In the step 720, each of the one or more combinations is turned on sequentially, and the combining algorithm is performed to compute a quality metric for each combination. Examples of quality metrics include SNR, SINR, RSSI, throughput and other CQIs. In the step 724, the algorithm selects the combination that provides the optimum correlation and/or quality metric. Examples combining techniques include the MMSE, MRC and EGC combining techniques.

In the present switching and combining scheme as described above, each antenna of the system is constantly on during the use, giving rise to possible increase in power consumption. To mitigate such situations, the processor can be configured to observe the power consumption, and the present scheme can be extended to include a power conservation mode, in which one or more antennas and associated Tx or Rx chains are tuned off and the remaining antennas are used for diversity based on the power consumption information. In a special case where only one antenna is kept on, a modal antenna can be selected to retain pattern and polarization diversity that is obtainable by switching the multiple modes of the modal antenna.

Simplifications to the present switching and combining scheme can be made by incorporating empirical data on actual usage of the system. For example, a usage pattern specific to a user of the handset may be obtained by observing, for example, which combination of modes is selected during each time period of a day. The observation can be made by the processor during the first one or two weeks, for example, to collect sufficient data. Based on the data, the processor can select a combination of modes at an appropriate time. Thus the process of running the combining algorithm can be skipped during the actual usage until the usage pattern changes.

As mentioned earlier, the present scheme is based on a hybrid of the switching and combining techniques in conjunction with the use of a modal antenna and can be applied to Tx diversity as well as Rx diversity. However, systems are often up-link limited and link improvements may be needed for the receive side of the base station for Tx diversity. Alternatively, the processor in the Tx diversity scheme of a handset may be configured to receive feedback from the base station to optimize the overall correlation and/or quality metric so that the receive side of the base station receive optimum signals. The present scheme involves computation of correlation coefficients, such as the ECC, which can be obtained by using radiation patterns that are the same for both transmission and reception of an antenna due to the reciprocity theorem of electromagnetism. Thus, once the correlation coefficients are computed and stored in the processor, the same data can be utilized for both Tx and Rx diversities for communication systems that transmit and receive on the same frequency channels.

What is claimed is:

1. An antenna system, comprising:
a plurality of antennas including at least one modal antenna comprising an antenna element positioned above a circuit board forming an antenna volume therebetween, a first parasitic element positioned outside said antenna volume and adjacent to the antenna element and being coupled to a first active tuning component, and a second parasitic element positioned within the antenna volume and coupled to a second active tuning component, said modal antenna being configured for band switching and beam steering using a single antenna element, wherein each of the at least one modal antenna is configured to have a plurality of modes associated therewith; and
a processor coupled to the plurality of antennas and configured to select one or more modes from the plurality of modes associated with each of the at least one modal antenna to have one or more selected modes associated with each of the at least one modal antenna, to combine modes to form one or more combinations of modes, wherein the modes in each of the one or more combinations are associated respectively with the plurality of antennas and comprise one of the one or more selected modes associated with each of the at least one modal antenna, and to select one of the one or more combinations that optimizes one or both of correlation and a quality metric for diversity.

2. The antenna system of claim 1, wherein
each of the at least one modal antenna comprises a plurality of active elements coupled to a plurality of parasitic elements; and
the processor is configured to control the plurality of active elements to configure the plurality of parasitic elements to select the one or more modes from the plurality of modes associated with each of the at least one modal antenna.

3. The antenna system of claim 1, wherein
the processor is further configured to store a correlation coefficient computed for each pair of modes for each of use conditions, wherein the modes in each pair comprise a mode associated with one antenna in the plurality of antennas and a mode associated with another antenna in the plurality of antenna;
based on information on the correlation coefficients, the processor is configured to select the one or more modes from the plurality of modes associated with each of the at least one modal antenna to meet predetermined correlation optimization criteria under the use condition during a time interval; and
the processor is further configured to turn on each of the one or more combinations sequentially, to perform a combining algorithm for each of the one or more combinations to compute the quality metric to select the one of the one or more combinations that optimizes one or both of the correlation and the quality metric for diversity.

4. The antenna system of claim 3, wherein
the processor is further configured to store antenna efficiency; and
based on the information on the correlation coefficients, the processor is configured to select the one or more modes from the plurality of modes associated with each of the at least one modal antenna to meet predetermined correlation optimization criteria including efficiency considerations under the use condition during a time interval.

5. The antenna system of claim 3, wherein
the correlation coefficient comprises an envelope correlation coefficient.

6. The antenna system of claim 3, wherein
the combining algorithm comprises one of a minimum mean squared error (MMSE) combining technique, a maximum ratio combining (MRC) technique and an equal gain combining (EGC) technique.

7. The antenna system of claim 3, wherein
the quality metric comprises one of signal to noise ratio (SNR), signal to interference-plus-noise ratio (SINR), receive signal strength indicator (RSSI), throughput and other channel quality indicators (CQI).

8. The antenna system of claim 1, wherein
two or more of the plurality of antennas are configured for reception for receive diversity.

9. The antenna system of claim 1, wherein
two or more of the plurality of antennas are configured for transmission for transmit diversity.

10. The antenna system of claim 9, wherein
the processor is configured to receive feedback from a base station to optimize the correlation and the quality metric for a receive side of the base station.

11. A method of implementing diversity in an antenna system, comprising steps of:
providing a plurality of antennas including at least one modal antenna comprising an antenna element positioned above a circuit board forming an antenna volume therebetween, a first parasitic element positioned outside said antenna volume and adjacent to the antenna element and being coupled to a first active tuning component, and a second parasitic element positioned within the antenna volume and coupled to a second active tuning component, said modal antenna being configured for band switching and beam steering using a single antenna element, wherein each of the at least one modal antenna is configured to have a plurality of modes;
first selecting one or more modes from the plurality of modes associated with each of the at least one modal antenna to have one or more selected modes associated with each of the at least one modal antenna; and
combining modes to form one or more combinations of modes, wherein the modes in each of the one or more combinations are associated respectively with the plurality of antennas and comprise one of the one or more selected modes associated with each of the at least one modal antenna; and
second selecting one of the one or more combinations that optimizes one or both of correlation and a quality metric for diversity.

12. The method of claim 11, wherein
the first selecting comprises:
computing a correlation coefficient for each pair of modes for each of use conditions, wherein the modes in each pair comprise a mode associated with one antenna in the plurality of antennas and a mode associated with another antenna in the plurality of antenna;

storing the correlation coefficients in a processor; and obtaining the one or more selected modes associated with each of the at least one modal antenna to meet predetermined correlation optimization criteria under the use condition during a time interval based on information on the correlation coefficients, wherein the combining comprises turning on each of the one or more combinations sequentially, and wherein the second selecting comprises performing a combining algorithm for each of the one or more combinations to compute the quality metric to select the one of the one or more combinations that optimizes one or both of the correlation and the quality metric for diversity.

13. The method of claim 12 wherein
the first selecting further comprises:
obtaining antenna efficiency;
storing the antenna efficiency in the processor; and
obtaining the one or more selected modes associated with each of the at least one modal antenna to meet predetermined correlation optimization criteria including efficiency considerations under the use condition during a time interval based on the information on the correlation coefficients.

14. The method of claim 12, wherein
the correlation coefficient comprises an envelope correlation coefficient.

15. The method of claim 12, wherein
the combining algorithm comprises one of a minimum mean squared error (MMSE) combining technique, a maximum ratio combining (MRC) technique and an equal gain combining (EGC) technique.

16. The method of claim 12, wherein
each of the at least one modal antenna comprises a plurality of active elements coupled to a plurality of parasitic elements; and
the turning on each of the one or more combinations sequentially comprises controlling the plurality of active elements to configure the plurality of parasitic elements in each of the at least one modal antenna.

17. The method of claim 11, wherein
the quality metric comprises one of signal to noise ratio (SNR), signal to interference-plus-noise ratio (SINR), receive signal strength indicator (RSSI), throughput and other channel quality indicators (CQI).

18. The method of claim 11, wherein
two or more of the plurality of antennas are configured for reception for receive diversity.

19. The method of claim 11, wherein
two or more of the plurality of antennas are configured for transmission for transmit diversity.

20. The method of claim 19, wherein
the second selecting the one of the one or more combinations that optimizes the correlation and the quality metric comprises using feedback from a base station.

21. The method of claim 11, further comprising steps of
observing power consumption; and
turning off one or more antennas and associated chains based on information on the power consumption for power conservation.

22. The method of claim 21, wherein
the turning off one or more antennas comprises tuning off all the antennas except one of the at least one modal antenna for pattern and polarization diversity by switching the plurality of modes associated with the one of the at least one the modal antenna.

23. The method of claim 11, further comprising steps of:
observing a usage pattern during a predetermined period; and
storing data of the usage pattern in a processor, wherein
the second selecting is performed based on the data of the usage pattern until the usage pattern changes by skipping the first selecting and the combining.

* * * * *